US012603728B2

(12) United States Patent
Khan Beigi et al.

(10) Patent No.: US 12,603,728 B2
(45) Date of Patent: Apr. 14, 2026

(54) SEQUENCE SELECTION BASED ON RECEIVED DOWNLINK SIGNALS

(71) Applicant: InterDigital Patent Holdings, Inc., Wilmington, DE (US)

(72) Inventors: Nazli Khan Beigi, Longueuil (CA); Jonghyun Park, Syosset, NY (US); Paul Marinier, Brossard (CA); Moon Il Lee, Melville, NY (US); Oumer Teyeb, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 96 days.

(21) Appl. No.: 18/500,422

(22) Filed: Nov. 2, 2023

(65) Prior Publication Data

US 2024/0146459 A1 May 2, 2024

Related U.S. Application Data

(60) Provisional application No. 63/421,703, filed on Nov. 2, 2022.

(51) Int. Cl.
*H04L 1/1607* (2023.01)
*H04W 72/044* (2023.01)
*H04W 72/232* (2023.01)

(52) U.S. Cl.
CPC ......... *H04L 1/1642* (2013.01); *H04W 72/044* (2013.01); *H04W 72/232* (2023.01)

(58) Field of Classification Search
CPC .. H04L 1/1642; H04W 72/232; H04W 72/044
See application file for complete search history.

(56) References Cited

PUBLICATIONS

3rd Generation Partnership Project (3GPP), "Technical Specification Group Radio Access Network; Study on Scenarios and Requirements for Next Generation Access Technologies", 3GPP TR 38.913 V17.0.0, (Release 17), Mar. 2022, 40 Pages.
3rd Generation Partnership Project (3GPP), "Technical Specification Group Radio Access Network; NR; Physical channels and modulation" (Release 17), 3GPP TS 38.211 V17.3.0, Sep. 2022, 136 Pages.

(Continued)

*Primary Examiner* — Michael Thier
*Assistant Examiner* — Tracy Lauren Raimondo
(74) *Attorney, Agent, or Firm* — Flaster Greenberg, P.C.

(57) ABSTRACT

A wireless transmit/receive unit (WTRU) may include a transceiver and a processor. The WTRU may be configured to receive one or more downlink signals. The WTRU may be configured to receive configuration information indicating time and frequency resources for transmission of hybrid automatic repeat request (HARQ) acknowledgement (ACK). The configuration information may indicate a first sequence. The WTRU may be configured to determine a set of sequences to be used in response to the receipt of the one or more downlink signals. The set of sequences may be determined based on the indicated first sequence. The WTRU may be configured to send a second sequence from the set of sequences in the time and frequency resources to indicate HARQ-ACK. The second sequence may be selected based on a number of physical downlink control channel (PDCCH) monitoring occasions associated with the indicated HARQ-ACK.

18 Claims, 6 Drawing Sheets

100

(56) References Cited

PUBLICATIONS

3rd Generation Partnership Project (3GPP), "Technical Specification Group Radio Access Network; NR; Physical layer procedures for control" (Release 17), 3GPP TS 38.213 V17.3.0, Sep. 2022, 260 Pages.

3rd Generation Partnership Project (3GPP), "Technical Specification Group Radio Access Network; NR; Medium Access Control (MAC) protocol specification" (Release 17), 3GPP TS 38.321 V17.2.0, Oct. 2022, 246 Pages.

3rd Generation Partnership Project (3GPP), "Technical Specification Group Radio Access Network; NR; Radio Resource Control (RRC) protocol specification" (Release 17), 3GPP TS 38.331 V17.2.0, Sep. 2022, 1298 Pages.

SEQUENCE SELECTION BASED ON RECEIVED DOWNLINK SIGNALS

CROSS-REFERENCE TO RELATED APPLICATIONS

This application claims priority to U.S. Provisional Application No. 63/421,703 filed on Nov. 2, 2022, the entirety of which is incorporated herein by reference.

BACKGROUND

Transmission timing of hybrid automatic repeat request (HARQ) acknowledgment (ACK)/negative ACK (NACK) is configurable (e.g., in new radio time-division duplexing (NR-TDD)). The HARQ ACK/NACK timing for the reception of a downlink signal and/or channel can be configured by one or more higher-layer parameters, indicating one or more parameters. The one or more parameters indicate an index and may be included in a physical uplink control channel (PUCCH) configuration. One or more of those parameters may be included. The number of bits and choices for each parameter are examples. Other numbers of bits or choices may be included.

A timing indication for the transmission of feedback and/or acknowledgments in NR-TDD may result in latency, for example, as the timing is based on semi-static configurations of uplink slots. However, considering dynamic TDD, multiple time-units may be configured as uplink dynamically. Moreover, the subband non-overlapping full duplex (SBFD) schemes have been proposed to include uplink subbands within downlink time-units, increasing the uplink transmission opportunities.

SUMMARY

A wireless transmit/receive unit (WTRU) may include a transceiver and a processor. The WTRU may be configured to receive one or more downlink signals. The WTRU may be configured to receive configuration information indicating time and frequency resources for transmission of hybrid automatic repeat request (HARQ) acknowledgement (ACK). The configuration information may indicate a first sequence. The WTRU may be configured to determine a set of sequences to be used in response to the receipt of the one or more downlink signals. The set of sequences may be determined based on the indicated first sequence. The WTRU may be configured to send a second sequence from the set of sequences in the time and frequency resources to indicate HARQ-ACK. The second sequence may be selected based on a number of physical downlink control channel (PDCCH) monitoring occasions associated with the indicated HARQ-ACK.

The WTRU may be configured to send the first sequence when the number of PDCCH monitoring occasions is less than a predetermined threshold. The configuration information may include a WTRU-specific root index or a cyclic shift. The set of sequences may be determined based on one or more of the WTRU-specific root index or the cyclic shift. The configuration information may include uplink subbands within subband non-overlapping full duplex (SBFD) download time units. The plurality of downlink signals may be received based on a higher-layer configuration which may be associated with the first time and frequency resources or the second time and frequency resources. The configuration information may include a WTRU-specific root index or a cyclic shift. The set of sequences may be based on the WTRU-specific root index or the cyclic shift. The set of sequences may be associated with a specific acknowledgment pattern. The WTRU may be configured to increment a counter for each detected PDCCH monitoring occasions. The second sequence may be selected based on a value of the counter. The second sequence may be selected based on a total detected downlink assignment index (DAI).

DETAILED DESCRIPTION

Figure 1A:
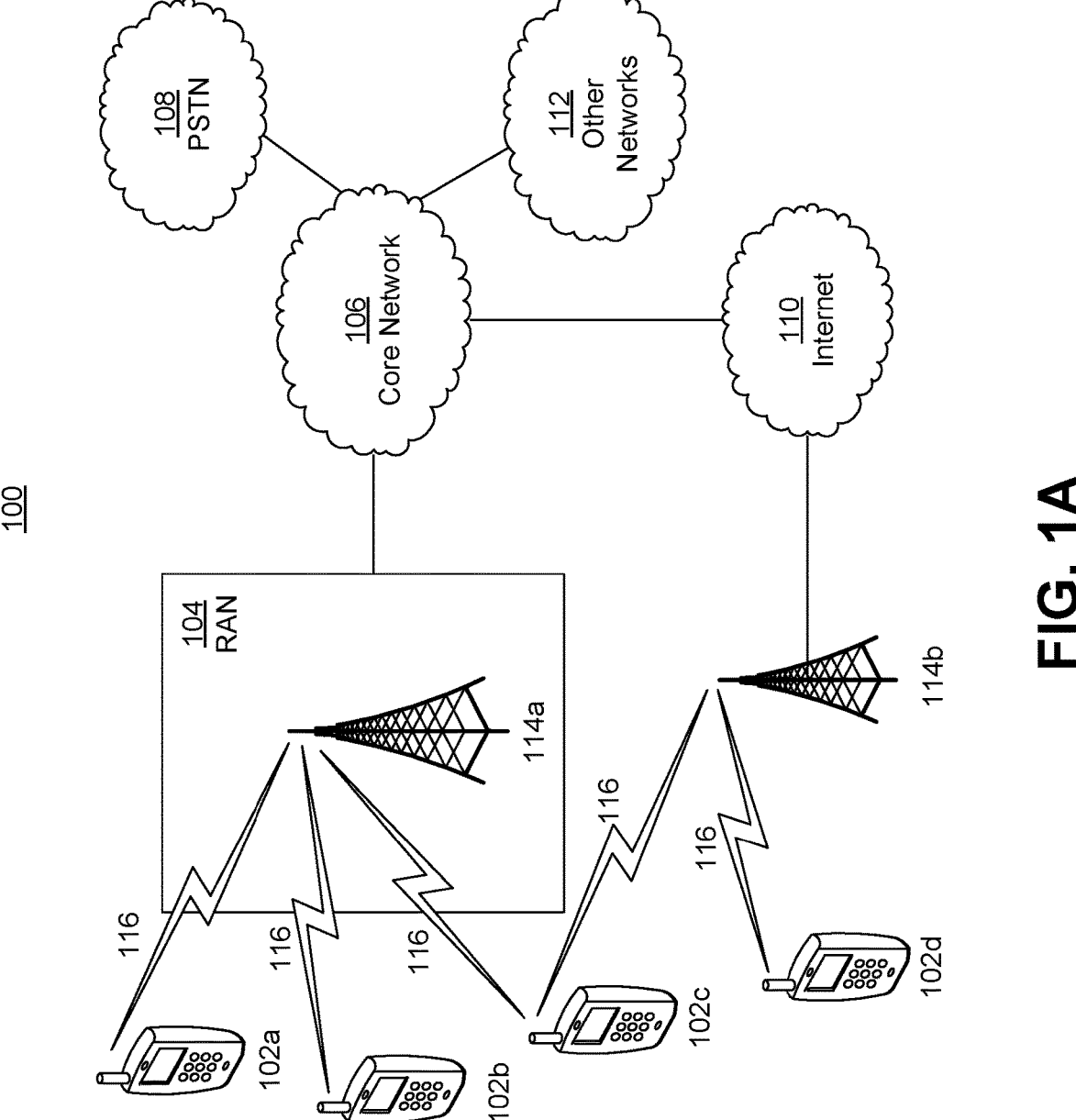
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (Z.T. UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (U.E.), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a WTRU.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (A.P.), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (R.F.), microwave, centimeter wave, micrometer wave, infrared (I.R.), ultraviolet (U.V.), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed U.L. Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as N.R. Radio Access, which may establish the air interface 116 using New Radio (N.R.).

In an embodiment, the base station 114a and the WTRUs 102a, 102b, 102c may implement multiple radio access technologies. For example, the base station 114a and the WTRUs 102a, 102b, 102c may implement LTE radio access and N.R. radio access together, for instance using dual connectivity (D.C.) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, N.R. etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a N.R. radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (I.P.) in the TCP/IP internet protocol suite. The networks 112 may include wired and/or wireless communications networks owned and/or operated by other service providers. For example, the networks 112 may include another C.N. connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
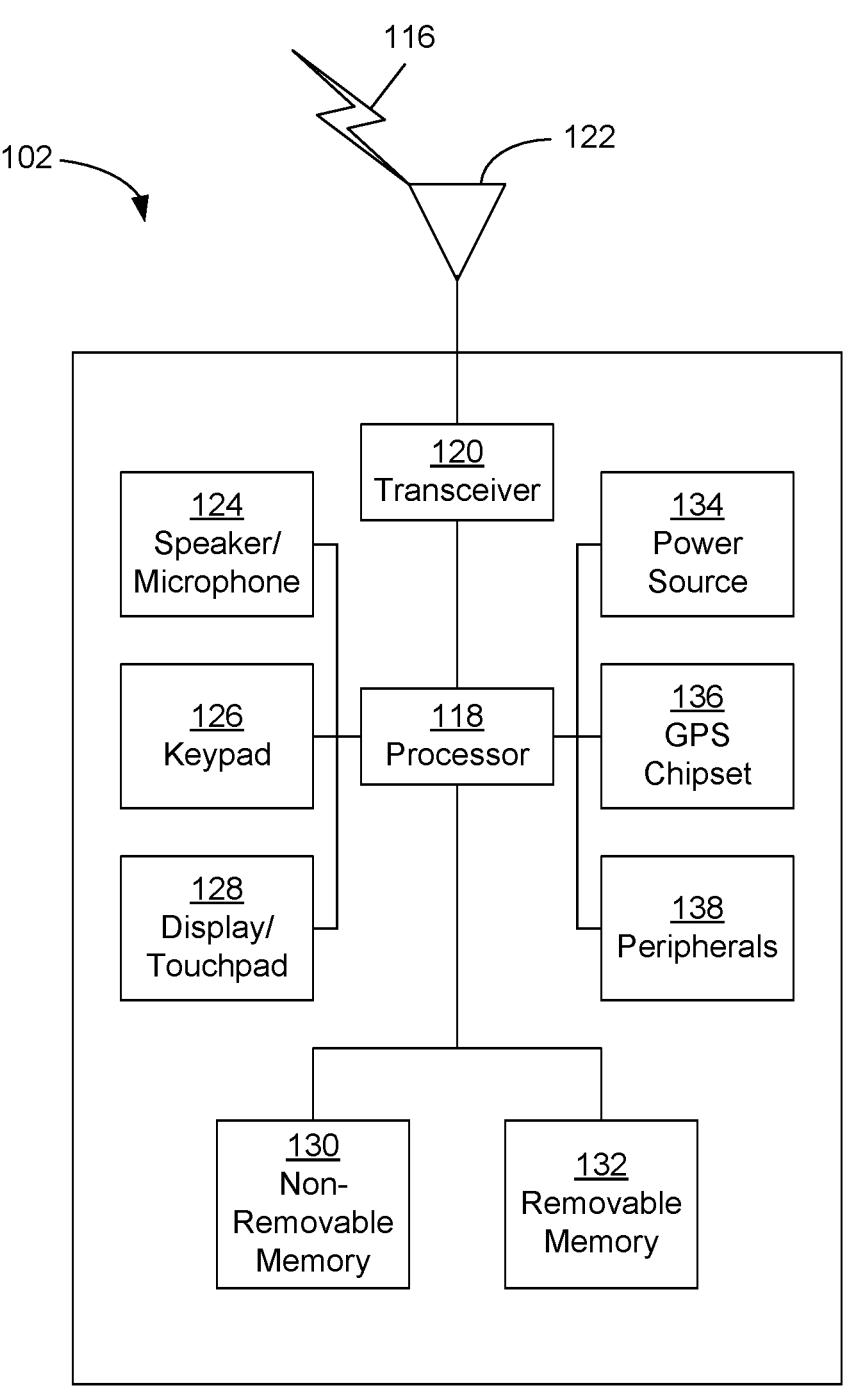
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (I.C.), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive R.F. signals. In an embodiment, the transmit/receive element 122 may be an emitter/detector configured to transmit and/or receive I.R., U.V., or visible light signals, for example. In yet another embodiment, the transmit/receive element 122 may be configured to transmit and/or receive both R.F. and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as N.R. and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (S.D.) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (F.M.) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the U.L. (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the U.L. (e.g., for transmission) or the downlink (e.g., for reception)).

Figure 1C:
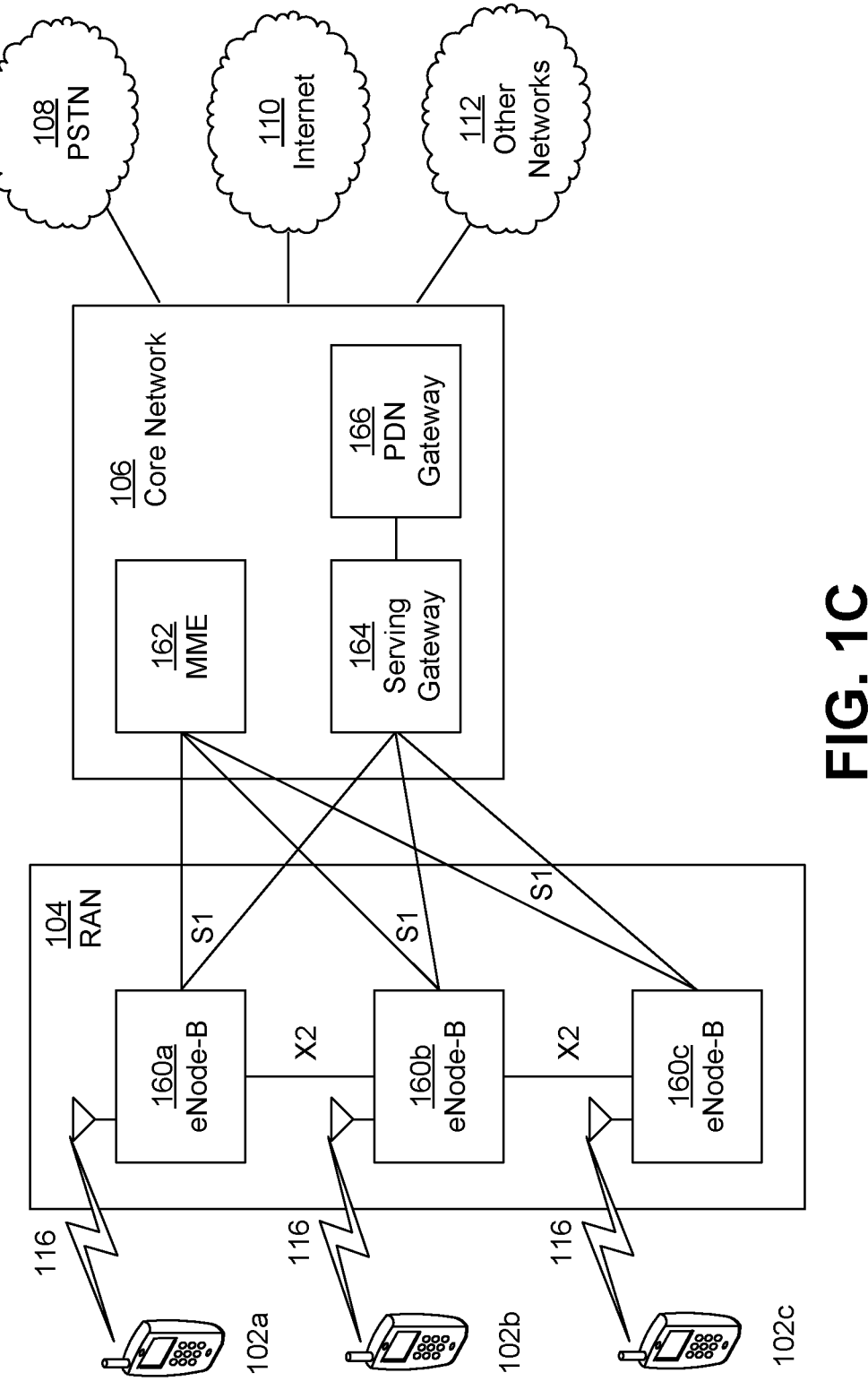
FIG. 1C is a system diagram illustrating an example radio access network (RAN) and an example core network (C.N.) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the U.L. and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the C.N. operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an I.P. gateway (e.g., an I.P. multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (A.P.) for the BSS and one or more stations (STAs) associated with the A.P. The A.P. may have an access or an interface to a Distribution System (D.S.) or another type of wired/wireless network that carries traffic in to and/or out of the BSS. Traffic to STAs that originates from outside the BSS may arrive through the A.P. and may be delivered to the STAs. Traffic originating from STAs to destinations outside the BSS may be sent to the A.P. to be delivered to respective destinations. Traffic between STAs within the BSS may be sent through the A.P., for example, where the source STA may send traffic to the A.P. and the A.P. may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS).

A WLAN using an Independent BSS (IBSS) mode may not have an A.P., and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the A.P. may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the A.P. In certain representative embodiments, Carrier Sense Multiple Access with Collision Avoidance (CSMA/CA) may be implemented, for example in in 802.11 systems. For CSMA/CA, the STAs (e.g., every STA), including the A.P., may sense the primary channel. If the primary channel is sensed/detected and/or determined to be busy by a particular STA, the particular STA may back off. One STA (e.g., only one station) may transmit at any given time in a given BSS.

High Throughput (H.T.) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the A.P., and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the A.P., the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
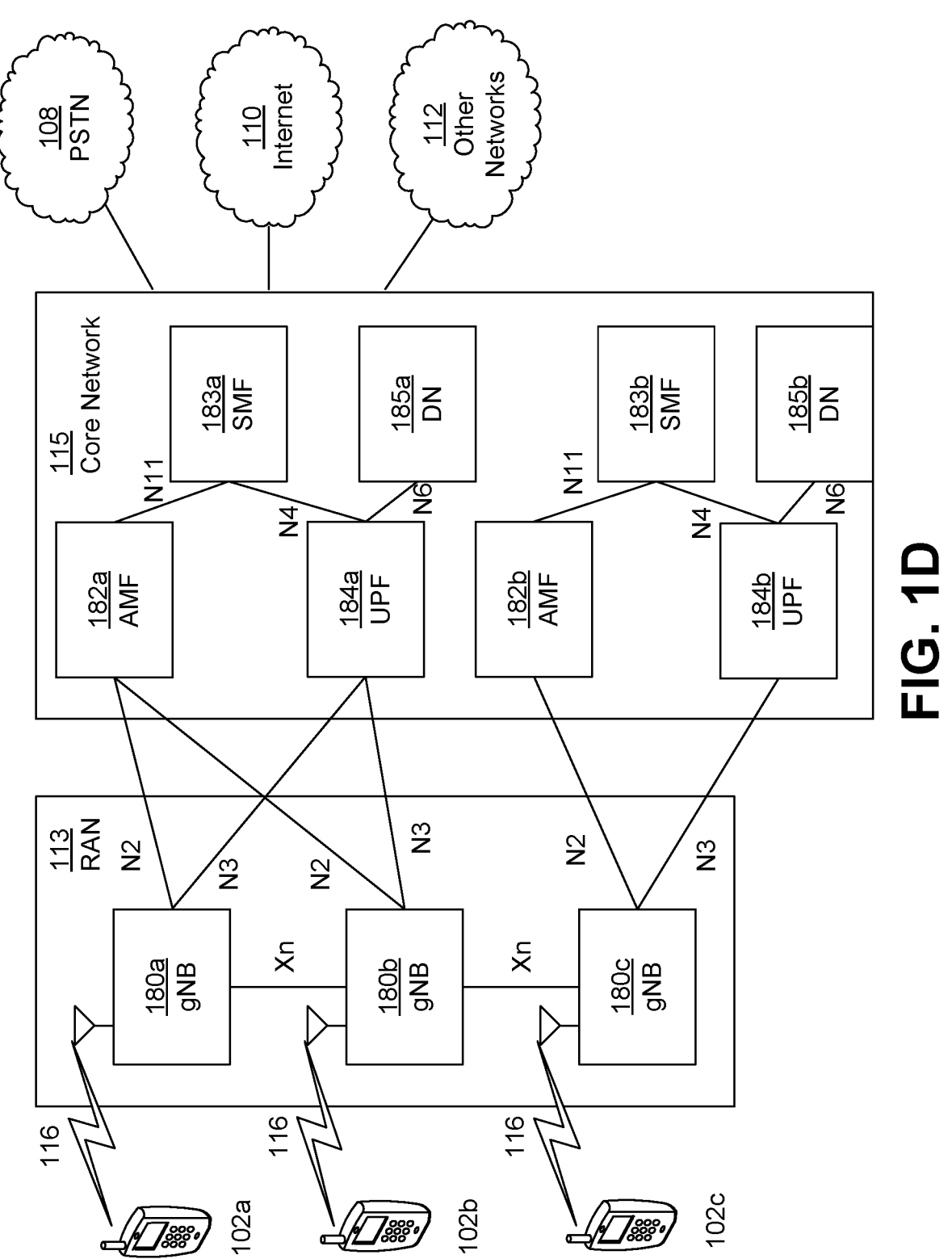
FIG. 1D is a system diagram illustrating a further example RAN and a further example C.N. that may be used within the communications system illustrated in FIG. 1A according to an embodiment.

FIG. 1D is a system diagram illustrating the RAN 113 and the CN 115 according to an embodiment. As noted above, the RAN 113 may employ an N.R. radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement D.C. principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the U.L. and/or DL, support of network slicing, dual connectivity, interworking between N.R. and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (D.N.) 185a, 185b. While each of the foregoing elements are depicted as part of the CN 115, it will be appreciated that any of these elements may be owned and/or operated by an entity other than the C.N. operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize C.N. support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an I.P. gateway (e.g., an I.P. multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (D.N.) 185a, 185b through the UPF 184a, 184b via the N3 interface to the UPF 184a, 184b and an N6 interface between the UPF 184a, 184b and the D.N. 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, D.N. 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct R.F. coupling and/or wireless communications via R.F. circuitry (e.g., which may include one or more antennas) may be used by the emulation devices to transmit and/or receive data.

In NR-TDD, the transmission timing of HARQ ACK/ NACK is configurable. The HARQ ACK/NACK timing for the reception of a downlink signal and/or channel may be configured by one or more higher-layer parameters, indicating parameter K1. The parameter K1 indicates an index in the table specified in the RRC parameter (e.g., via dl-DataToUL-ACK in PUCCH-Config).

Table 1 below depicts an example HARQ-ACK timing indication in PUCCH-Config via parameter dl-DataToUL-ACK. Table 1 is a non-limiting example of the parameters that may be included in the PUCCH configuration. One or more of the parameters may be included. Moreover, the number of bits and choices for each parameter shown in Table 1 are for exemplary purposes only. Other bits or choices may be configured for each parameter that may be included in the PUCCH configuration.

US 12,603,728 B2

13

TABLE 1

Example HARQ-ACK timing indication in PUCCH-Config via parameter
dl-DataToUL-ACK

```
PUCCH-Config ::=  SEQUENCE {
...
   resourceToAddModList SEQUENCE (SIZE
(1..maxNrofPUCCH-Resources)) OF PUCCH-Resource
   dl-DataToUL-ACK   SEQUENCE (SIZE (1..8)) OF INTEGER
(0..15) Optional
...
}
maxNrofPUCCH-Resources INTEGER ::= 128
```

Figure 2:
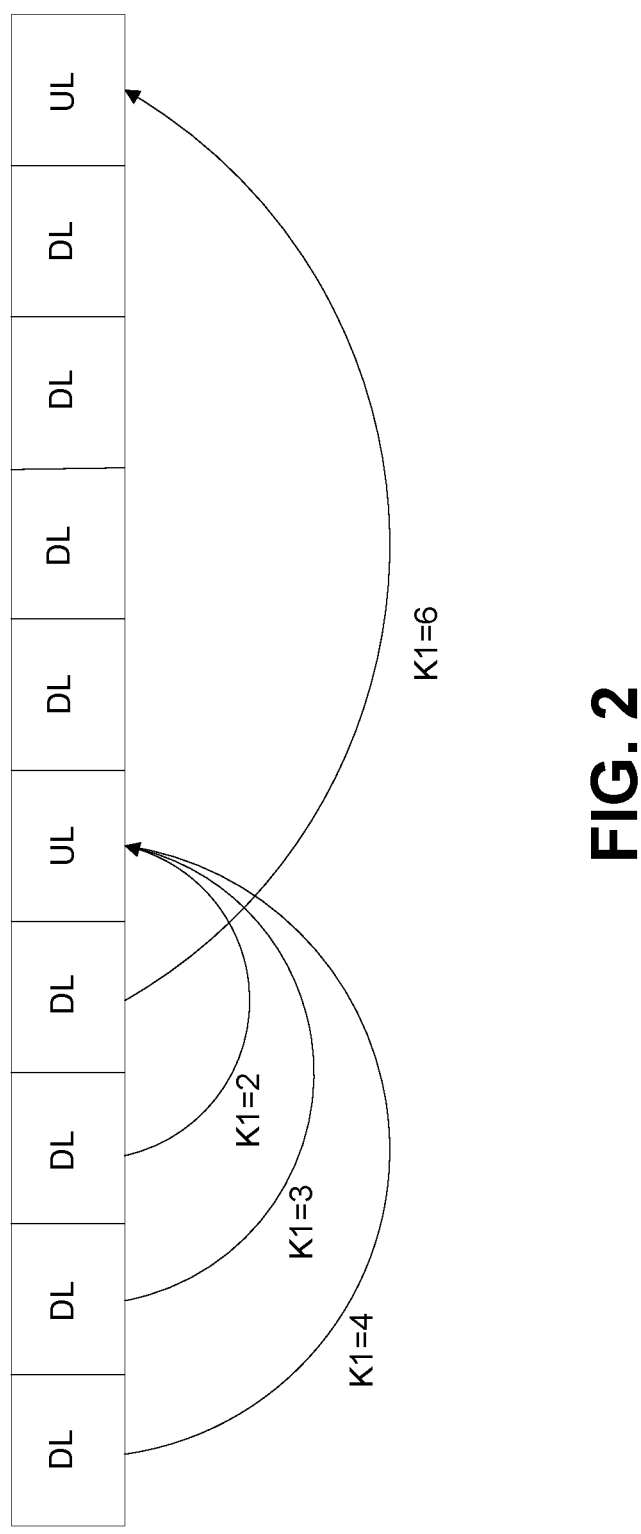
FIG. 2 depicts an example hybrid automatic repeat request (HARQ) acknowledgment (ACK) (HARQ-ACK) timing indication.

FIG. 2 depicts an example of HARQ-ACK timing indication 200 in PUCCH-Config via parameter dl-DataToUL-ACK. For example, for a slot configuration DDDDU, the HARQ ACK/NACK may be configured so that the ACK/NACK information bits and/or codebooks may be multiplexed and transmitted at one or more UL slots by specifying K1.

The timing indication for the transmission of feedback and/or acknowledgments in NR-TDD may result in latency, for example, as the timing may be based on semi-static configurations of UL slots. However, considering dynamic TDD, multiple time-units may be configured as UL dynamically. Moreover, subband non-overlapping full duplex (SBFD) schemes may include UL subbands within DL time-units, increasing UL transmission opportunities.

The latency of PUCCH (e.g., feedback and/or acknowledgment) transmission may be reduced based on opportunistic transmissions in UL resources.

Methods of latency reduction based on the opportunistic transmission of acknowledgments may be implemented. Sequence-based opportunistic acknowledge transmission may also be implemented wherein the sequence selection may be based on the received signals and/or channels. Methods on opportunistic HARQ-ACK and group DCI acknowledgment may also be implemented.

A WTRU may transmit or receive a physical channel or reference signal according to one or more spatial domain filters. The term "beam" may refer to a spatial domain filter.

The WTRU may transmit a physical channel or signal using the same spatial domain filter as the spatial domain filter used for receiving an RS (such as CSI-RS) or a SS block. The WTRU transmission may be referred to as "target," and the received RS or SS block may be referred to as "reference" or "source." In such cases, the WTRU may transmit the target physical channel or signal according to a spatial relation with reference to such an RS or SS block.

The WTRU may transmit a first physical channel or signal according to the same spatial domain filter as the spatial domain filter used for transmitting a second physical channel or signal. The first and second transmissions may be referred to as "target" and "reference" (or "source"), respectively. The WTRU may transmit the first (target) physical channel or signal according to a spatial relation with reference to the second (reference) physical channel or signal.

A spatial relation may be implicit, configured by RRC, or signaled by MAC CE or DCI. For example, a WTRU may implicitly transmit PUSCH and DM-RS of PUSCH according to the same spatial domain filter as an SRS indicated by an SRI indicated in DCI or configured by RRC. In another example, a spatial relation may be configured by RRC for an SRS resource indicator (SRI) or signaled by MAC CE for a PUCCH. Such spatial relation may be referred to as a "beam indication."

The WTRU may receive a first (target) downlink channel or signal according to the same spatial domain filter or spatial reception parameter as a second (reference) downlink channel or signal. For example, such an association may exist between a physical channel such as PDCCH or PDSCH and its respective DM-RS. At least when the first and second signals are reference signals, such an association may exist when the WTRU is configured with a quasi-colocation (QCL) assumption type D between corresponding antenna ports. Such association may be configured as a TCI (transmission configuration indicator) state. A WTRU may be indicated for an association between a CSI-RS or SS block and a DM-RS by an index to a set of TCI states configured by RRC and/or signaled by MAC CE. Such an indication may also be referred to as a "beam indication."

A TRP (e.g., transmission and reception point) may be interchangeably used herein with one or more of TP (transmission point), RP (reception point), RRH (radio remote head), DA (distributed antenna), BS (base station), a sector (of a BS), and a cell (e.g., a geographical cell area served by a BS).

Multi-TRP may be interchangeably used herein with one or more of MTRP, M-TRP, and/or multiple TRPs.

The term "subband" and/or "sub-band" is used herein to refer to a frequency-domain resource and may be characterized by one or more of a set of resource blocks (RBs), a set of resource block sets (RB sets) (e.g., when a carrier has intra-cell guard bands), a set of interlaced resource blocks, a bandwidth part, a bandwidth portion, a carrier, or a carrier portion.

For example, a subband may be characterized by a starting RB and a number of RBs for a set of contiguous RBs within a bandwidth part. A subband may also be defined by the value of a frequency-domain resource allocation field and bandwidth part index.

The term "XDD" is used herein to refer to a subband-wise duplex (e.g., UL or DL being used per subband) and may be characterized by one or more of the following. XDD may be characterized by Cross Division Duplex (e.g., subband-wise FDD within a TDD band). XDD may be characterized by subband-based full duplex (e.g., full duplex as both UL and DL are used/mixed on a symbol/slot, but either UL or DL being used per subband on the symbol/slot). XDD may be characterized by frequency-domain multiplexing (FDM) of DL/UL transmissions within a TDD spectrum. XDD may be characterized by a subband non-overlapping full duplex (e.g., non-overlapped sub-band full-duplex). XDD may be characterized by a full duplex other than a same-frequency (e.g., spectrum sharing, subband-wise-overlapped) full duplex. XDD may be characterized by an advanced duplex method (e.g., other than (pure) TDD or FDD).

The term "dynamic(/flexible) TDD" is used herein to refer to a TDD system/cell which may dynamically (and/or flexibly) change/adjust/switch a communication direction (e.g., a downlink, an uplink, or a sidelink, etc.) on a time instance (e.g., slot, symbol, subframe, and/or the like). For example, in a system employing dynamic/flexible TDD, a component carrier(CC) or a bandwidth part (BWP) may have one single type among 'D,' 'U,' and 'F' on a symbol/slot, based on an indication by a group-common(GC)-DCI (e.g., format 2_0) comprising a slot format indicator (SFI), and/or based on tdd-UL-DL-config-common/dedicated configurations. On a given time instance/slot/symbol, a first gNB (e.g., cell, TRP) employing dynamic/flexible TDD may transmit a downlink signal to a first WTRU being communicated/associated with the first gNB based on a first SFI and/or tdd-UL-DL-config configured and/or indicated by the first gNB, and a second gNB (e.g., cell, TRP) employing dynamic/flexible TDD may receive an uplink signal transmitted from a second WTRU being communicated/associated with the second gNB based on a second SFI and/or tdd-UL-DL-config configured and/or indicated by the second gNB. For example, the first WTRU may determine that the reception of the downlink signal is being interfered with by the uplink signal, where the interference caused by the uplink signal may refer to a WTRU-to-WTRU cross-link interference (CLI).

A WTRU may report a subset of channel state information (CSI) components, where CSI components may correspond to at least a CSI-RS resource indicator (CRI), a SSB resource indicator (SSBRI), an indication of a panel used for reception at the WTRU (such as a panel identity or group identity), measurements such as L1-RSRP, L1-SINR taken from SSB or CSI-RS (e.g., cri-RSRP, cri-SINR, ssb-Index-RSRP, ssb-Index-SINR), and other channel state information such as at least rank indicator (RI), channel quality indicator (COI), precoding matrix indicator (PMI), Layer Index (LI), and/or the like.

A property of a grant or assignment may include one or more of the following. A property of a grant or an assignment may include a frequency allocation. A property of a grant or an assignment may include an aspect of time allocation, such as a duration. A property of a grant or an assignment may include a priority. A property of a grant or an assignment may include a modulation and coding scheme. A property of a grant or an assignment may include a transport block size. A property of a grant or an assignment may include a number of spatial layers. A property of a grant or an assignment may include a number of transport blocks. A property of a grant or an assignment may include a TCI state, CRI, or SRI. A property of a grant or an assignment may include a number of repetitions. A property of a grant or an assignment may include whether the repetition scheme is Type A or Type B. A property of a grant or an assignment may include whether the grant is a configured grant type 1, type 2, or a dynamic grant. A property of a grant or an assignment may include whether the assignment is a dynamic assignment or a semi-persistent scheduling (e.g., configured) assignment. A property of a grant or an assignment may include a configured grant index or a semi-persistent assignment index. A property of a grant or an assignment may include a periodicity of a configured grant or assignment. A property of a grant or an assignment may include a channel access priority class (CAPC). A property of a grant or an assignment may include any parameter provided in a DCI, by MAC, or by RRC for the scheduling of the grant or assignment.

An indication by DCI may include one or more of the following. An indication by DCI may include an explicit indication by a DCI field or by RNTI used to mask CRC of the PDCCH. An indication by DCI may include an implicit indication of a property such as DCI format, DCI size, Coreset or search space, aggregation level, and/or first resource element of the received DCI (e.g., index of first Control Channel Element), where the mapping between the property and the value may be signaled by RRC or MAC.

A signal may be interchangeably used herein to refer to one or more of a sounding reference signal (SRS), channel state information (e.g., a reference signal (CSI-RS)), a demodulation reference signal (DM-RS), a phase tracking reference signal (PT-RS), and/or a synchronization signal block (SSB).

RS may be interchangeably used herein to refer to one or more of a RS resource, a RS resource set, a RS port, and/or a RS port group. RS may also be interchangeably used herein to refer to one or more of SSB, CSI-RS, SRS, and/or DM-RS.

Sequence selection may be based on received DL signals and/or channels. When a WTRU is configured with SPS PDSCH or DG-PDSCH, the HARQ-ACK processes indexes may be indicated. As such, when the WTRU transmits a positive acknowledgment, the positive acknowledgment may imply that one or more (e.g., all) possible HARQ-ACK processes were acknowledged. However, in case of PDCCH reception (e.g., for TCI state update, SPS PDSCH release, group-common DCI, and so forth), the WTRU may not know in advance about all possible occasions. As such, the WTRU may have no means to realize if one or more PDCCH were dropped and/or not received.

For example, a WTRU may determine and/or be configured or indicated to generate a HARQ-ACK codebook, where the codebook indication is based on one or more sequences. For example, instead of generating a set of first and second values (e.g., 0 or 1) for indication of NACK or ACK, respectively, the WTRU may be configured with one or more sequence indexes that may be used as an index to a set of ACK/NACK patterns and/or scenarios in a respective codebook.

For example, a WTRU may be indicated or configured to receive one or more PDSCH downlink transmissions. The WTRU may use the total DAI field in the UL grant DCI to determine the total number of TBs or CBGs to be received. Additionally or alternatively, the WTRU may determine the total number of TBs or CBGs to be received based on the received configurations and/or grant DCI indications.

For example, if the WTRU determines that one or more (e.g., all) PDSCH codewords (e.g., expected PDSCH codewords) were received correctly, the WTRU may generate and/or determine a first sequence (e.g., S1) from the codebook. The WTRU may transmit the first sequence on the configured time and frequencies for opportunistic acknowledgment transmission.

For example, the WTRU may determine the total number of control signals and/or channels in downlink receptions (e.g., PDCCH) based on the number of detected occasions. As such, the WTRU may determine the sequence to be used that is associated with the total number of received control signals and/or channels based on the corresponding index in the respective codebook. Additionally or alternatively, if the WTRU has detected a specific pattern of control signals and/or channels, the WTRU may select the sequence index from the codebook corresponding to the detected pattern and/or scenario. The number of codebook entries may be limited (e.g., up to N+1 sequences implying maximum N patterns for reception of control signals and/or channels).

For example, if the WTRU has detected (e.g., only detected) a single DCI, the WTRU may determine to select a second sequence (e.g., S2) that is associated with the detection pattern and/or scenario from the codebook. The WTRU may then transmit the selected sequence on the configured time and frequency resources for the opportunistic acknowledgment transmission. If the WTRU has detected two DCIs, the WTRU may determine to select a third sequence (e.g., S3) and transmit it on the configured time and frequency resources for the opportunistic acknowledgment transmission.

The gNB may monitor the time and frequency resources configured for the opportunistic acknowledgment for the reception of one or more sequences. Upon successful detection of a sequence, the gNB may determine the respective WTRU and the index of the codebook's entry based on the detected sequence.

An opportunistic group DCI may indicate to acknowledge transmission. For example, a group command may need to be sent to a multitude of WTRUs for reduced signaling and latency. The group command, as an example, may be a group DCI command to WTRUs to trigger some action, like a handover. For example, in the context of network energy savings, the network may decide to turn off a certain cell or sector of a base station and may want to inform the WTRUs being served by that cell to perform a handover (e.g., to a candidate cell that was pre-configured, similar to conditional handover, but the handover, in this case, triggered when the WTRUs receive the group DCI). The network may, for example, wait for a certain duration after the sending of the group DCI (e.g., to give the WTRUs enough time to perform the HO) before turning off the concerned cell/sector.

Another example is mobile nodes, such as mobile integrated access backhaul (IAB) installed on moving vehicles, serving the WTRUs within the vehicle as relays. When the vehicle moves, the IAB node may need to migrate to another serving base station, thereby triggering a handover of all the WTRUs it is serving at the same time. Instead of performing the HO signaling to the WTRUs one by one and each WTRU performing the HO in sequence, which is inefficient from a signaling point of view but also may lead to problems (e.g., late HO command for some of the WTRUs that can result in HO failures), a group DCI that triggers the HO for all the WTRUs may be used.

A group DCI message may be relatively more important than other DCI messages because the group DCI message is targeted to multiple WTRUs, and if the group DCI message is used to indicate something like a group HO command, the WTRUs that may not have received it correctly may end up experiencing Radio link failure (e.g., for the case of the network energy saving scenario described above). As such, mechanisms are required to enable the network to receive an acknowledgment of the reception of such a DCI by the WTRUs.

Figure 3:
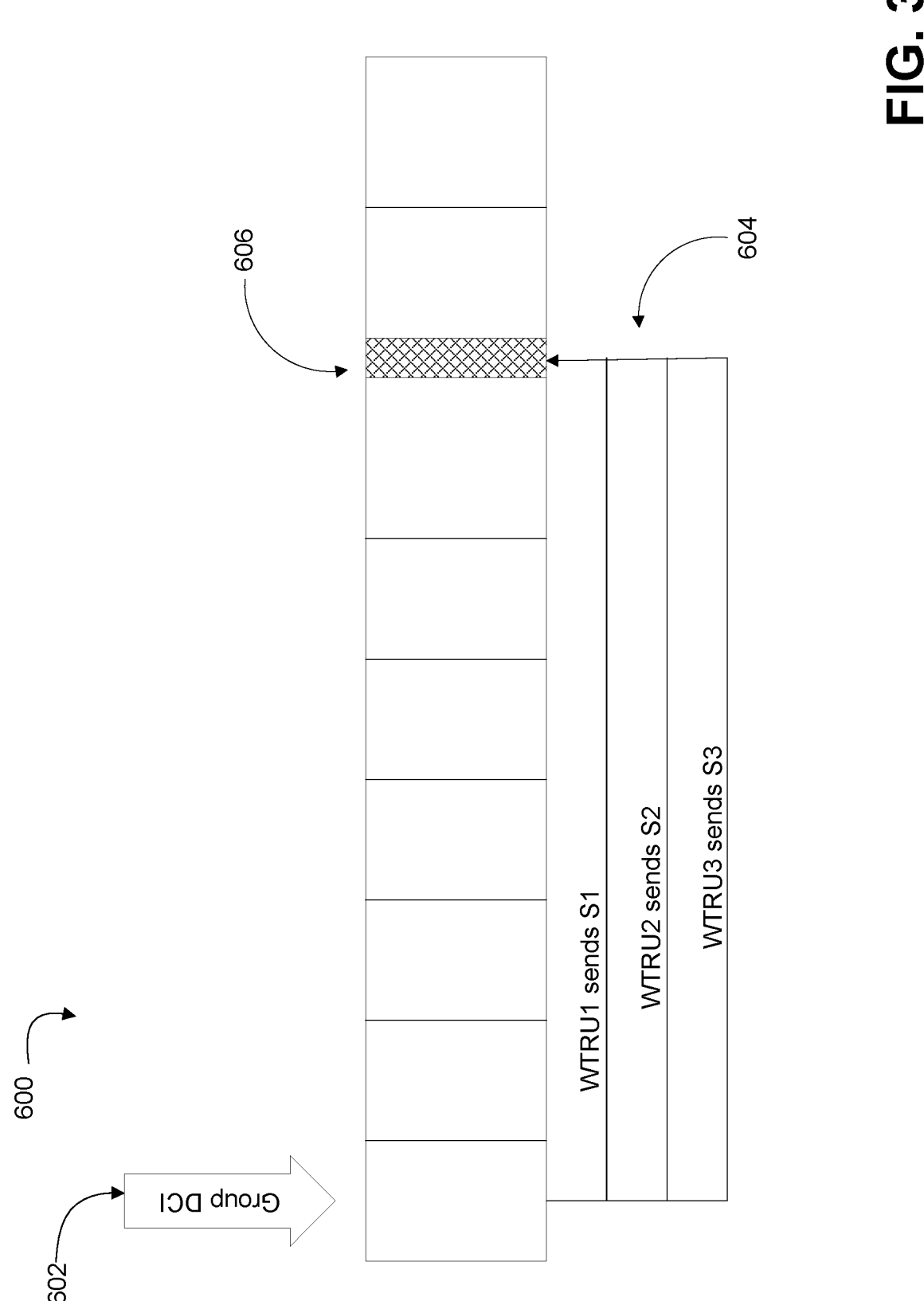
FIG. 3 depicts an example opportunistic acknowledgment transmission for high priority downlink control information (DCI).

FIG. 3 depicts an example opportunistic acknowledgment transmission 600 for high priority DCI. A set of WTRUs are configured with a group WTRU identity (e.g., G-RNTI for group DCI) 602. Each WTRU within the set (e.g., group) of WTRUs may be configured with a set of sequences (e.g., WTRU1 is configured with a first sequence S1, WTRU2 is configured with a second sequence S2, . . . , and N-th WTRU is configured with N-th sequence SN) for opportunistic acknowledgment transmission of a group DCI 604 (e.g., each sequence with WTRU-specific root index (r1), cyclic shift (c1), and so forth) regarding the reception of a group DCI command. The WTRU may receive one or more time and frequency resources for opportunistic acknowledgment transmission (e.g., semi-static, dynamic, implicit, or explicit) 606. The WTRU may detect a group DCI (e.g., a DCI scrambled by the associated group WTRU identity) in the PDCCH. The WTRU may transmit the configured sequence for acknowledging (ACKing) 604 the group DCI in the configured and/or determined opportunistic resources 606.

After sending the group DCI, the gNB may monitor the reception of one or more sequences in the time and frequency resources for the opportunistic acknowledge (e.g., HARQ-ACK) transmission regarding the group DCI. The gNB may identify the WTRUs that have not received the group DCI (e.g., the sequences configured for the WTRUs were not detected). The gNB may resend the group DCI or decide to send the information/command in another way (e.g., send a dedicated DCI to each concerned WTRU, send the information via another means such as a MAC CE or RRC reconfiguration message, etc.).

It should be appreciated that although the example shown in FIG. 3 shows a group DCI, the example can be used for any DCI (e.g., high priority DCI that is sent to just one WTRU).

It should be appreciated that the group ACK for group HARQ-ACK transmission described herein may be combined with the group DCI HARQ mechanism described here. For example, the WTRU may be configured with multiple sequences: Sa for everything received correctly (e.g., all transport blocks and also the group DCI); Sb for one or more (e.g., all) transport blocks received correctly but no group DCI received (e.g., all transport blocks and also the group DCI); Sc for every transport blocks received incorrectly and also no group DCI received; Sd for every transport blocks received incorrectly but a group DCI received; and/or Sf for some of the transport blocks received incorrectly but a group DCI received.

The WTRU may indicate the reception of the group DCI as well as the reception of other transport blocks at the same time. Also, just because some of the transport blocks before the group DCI were received were not received correctly, the WTRU will not be constrained not to use the opportunistic resources to indicate the reception of the group DCI without necessarily waiting for the K1 slot after the reception of the group DCI (e.g., as in normal HARQ-ACK). Additionally, if the group DCI is indicating a HO, the WTRU may execute the HO immediately without waiting for K1 slots to send the ACK (e.g., stop monitoring the control channels of the source cell immediately and start synchronizing with the target cell).

The invention claimed is:

1. A wireless transmit/receive unit (WTRU) comprising:
a transceiver; and
a processor configured to:
   receive, via the transceiver, one or more downlink signals;
   receive, via the transceiver, configuration information indicating time and frequency resources for transmission of hybrid automatic repeat request (HARQ) acknowledgement (ACK), wherein the configuration information indicates a first sequence;
   determine a set of sequences to be used in response to the receipt of the one or more downlink signals, wherein the set of sequences are determined based on the indicated first sequence; and
   transmit, via the transceiver, a second sequence from the set of sequences in the time and frequency resources to indicate HARQ-ACK, wherein the second sequence is selected based on a number of physical downlink control channel (PDCCH) monitoring occasions associated with the indicated HARQ-AC K.

2. The WTRU of claim 1, wherein the processor is further configured to transmit, via the transceiver, the first sequence when the number of PDCCH monitoring occasions is less than a predetermined threshold.

3. The WTRU of claim 1, wherein the configuration information comprises a WTRU-specific root index or a cyclic shift.

4. The WTRU of claim 3, wherein the set of sequences is determined based on one or more of the WTRU-specific root index or the cyclic shift.

5. The WTRU of claim 1, wherein the configuration information comprises uplink subbands within subband non-overlapping full duplex (SBFD) download time units.

6. The WTRU of claim 1, wherein the one or more downlink signals are received based on a higher-layer configuration associated with the time and frequency resources.

7. The WTRU of claim 1, wherein the set of sequences is associated with a specific acknowledgment pattern.

8. The WTRU of claim 1, wherein the processor is further configured to increment a counter for each PDCCH monitoring occasion, and wherein the second sequence is selected based on a value of the counter.

9. The WTRU of claim 1, wherein the second sequence is selected based on a total detected downlink assignment index (DAI).

10. A method performed by a wireless transmit/receive unit (WTRU), the method comprising:

receiving one or more downlink signals;

receiving configuration information indicating time and frequency resources for transmission of HARQ-ACK, wherein the configuration information indicates a first sequence;

determining a set of sequences to be used in response to the receipt of the one or more downlink signals, wherein the set of sequences are determined based on the indicated first sequence; and sending a second sequence from the set of sequences in the time and frequency resources to indicate HARQ-ACK, wherein the second sequence is selected based on a number of physical downlink control channel (PDCCH) monitoring occasions associated with the indicated HARQ-ACK.

11. The method of claim 10, further comprising sending the first sequence when the number of PDCCH monitoring occasions is less than a predetermined threshold.

12. The method of claim 10, wherein the configuration information comprises a WTRU-specific root index or a cyclic shift.

13. The method of claim 12, wherein the set of sequences is determined based on one or more of the WTRU-specific root index or the cyclic shift.

14. The method of claim 10, wherein the configuration information comprises uplink subbands within subband non-overlapping full duplex (SBFD) download time units.

15. The method of claim 10, wherein the one or more downlink signals are received based on a higher-layer configuration associated with the time and frequency resources.

16. The method of claim 10, wherein the set of sequences is associated with a specific acknowledgment pattern.

17. The method of claim 10, further comprising incrementing a counter for each PDCCH monitoring occasion, and wherein the second sequence is selected based on a value of the counter.

18. The method of claim 10, wherein the second sequence is selected based on a total detected downlink assignment index (DAI).

* * * * *